US009470413B2

(12) United States Patent
Li

(10) Patent No.: US 9,470,413 B2
(45) Date of Patent: Oct. 18, 2016

(54) SOLAR POWERED LED LIGHTING SYSTEM AND A UMBRELLA HAVING THE SAME

(71) Applicant: ATLEISURE, LLC, Atlanta, GA (US)

(72) Inventor: Chuan Li, Atlanta, GA (US)

(73) Assignee: Atleisure LLC, Atlanta, GA (US)

( * ) Notice: Subject to any disclaimer, the term of this patent is extended or adjusted under 35 U.S.C. 154(b) by 106 days.

(21) Appl. No.: 14/302,156

(22) Filed: Jun. 11, 2014

(65) Prior Publication Data
US 2015/0362171 A1 Dec. 17, 2015

(51) Int. Cl.
F21V 33/00 (2006.01)
A45B 23/00 (2006.01)
F21S 9/03 (2006.01)
A45B 3/04 (2006.01)
H05B 33/08 (2006.01)
H05B 37/02 (2006.01)
F21Y 101/02 (2006.01)

(52) U.S. Cl.
CPC ............... F21V 33/006 (2013.01); A45B 3/04 (2013.01); A45B 23/00 (2013.01); F21S 9/035 (2013.01); H05B 33/0845 (2013.01); H05B 37/0218 (2013.01); A45B 2023/0031 (2013.01); A45B 2200/1018 (2013.01); A45B 2200/1027 (2013.01); F21Y 2101/02 (2013.01)

(58) Field of Classification Search
CPC .................................. A45B 2200/10; A45B 2200/1018–2200/1027; A45B 3/04; A45B 23/00; F21V 33/006; F21S 9/035; H05B 33/0845; H05B 37/0218
See application file for complete search history.

(56) References Cited

U.S. PATENT DOCUMENTS 5,621,283 A * 4/1997 Watson ............... H05B 39/086
315/194
7,497,583 B2 3/2009 Ma
7,753,546 B2 7/2010 Kuelbs
2004/0228118 A1* 11/2004 Peterson ................. A45B 3/04
362/102
2007/0041175 A1 2/2007 Chang
2007/0127231 A1* 6/2007 Li .......................... A45B 3/00
362/102
2011/0156598 A1* 6/2011 Li ........................ A45B 23/00
315/158

FOREIGN PATENT DOCUMENTS

WO 2004102063 A2 11/2004
WO 2010093085 A1 8/2010

OTHER PUBLICATIONS

International Search Report and Written Opinion mailed Feb. 11, 2015 in International Application No. PCT/US2014/042234 filed Jun. 13, 2014.

* cited by examiner

Primary Examiner — Anh Mai
Assistant Examiner — Nathaniel Lee
(74) Attorney, Agent, or Firm — ATLawip LLC; Jeffrey T. Breloski

(57) ABSTRACT

Aspects of the present invention relates to a solar powered LED lighting system for an umbrella. In certain embodiments, the solar powered LED lighting system has (a) a rechargeable battery, (b) a solar panel, (c) one or more LED lights, (d) one or more touch control sensors, and (e) an unipath touch control circuit. The rechargeable battery is used to provide electricity to the solar powered LED lighting system. The solar panel converts optical energy to electrical energy and charges the rechargeable battery. The LED lights are installed on the umbrella to provide lighting. The touch control sensors are used to sense a user's touch event, and responsively generate a control signal. The unipath touch control circuit receives the control signals from the touch control sensors, and controls the solar powered LED lighting system according to the received control signal.

12 Claims, 6 Drawing Sheets

SOLAR POWERED LED LIGHTING SYSTEM AND A UMBRELLA HAVING THE SAME

FIELD OF THE INVENTION

The present invention relates generally to large umbrellas such as patio umbrellas, market umbrellas and beach umbrella, and more particularly to a solar powered LED lighting system for these umbrellas.

BACKGROUND OF THE INVENTION

Oversized umbrellas are widely used in the patio, markets, as well as beaches. They provide users with protections from the sun burn, or rain. When it is used in remote locations such as markets or remote beaches where electricity is not available, illuminating the area under or around the umbrella becomes a problem. It is desirable to have a lighting system that does not depend on the availability of electricity.

Therefore, a heretofore unaddressed need exists in the art to address the aforementioned deficiencies and inadequacies.

SUMMARY OF THE INVENTION

In one aspect, the present invention relates to a solar powered LED lighting system for an umbrella. In certain embodiments, the solar powered LED lighting system has (a) a rechargeable battery, (b) a solar panel, (c) one or more LED lights, (d) one or more touch control sensors, and (e) an unipath touch control circuit. The rechargeable battery is used to provide electricity to the solar powered LED lighting system. The solar panel converts optical energy to electrical energy and charges the rechargeable battery. The LED lights are installed on the umbrella to provide lighting. The touch control sensors are used to sense a user's touch event, and responsively generate a control signal. The unipath touch control circuit receives the control signals from the touch control sensors, and controls the solar powered LED lighting system according to the received control signal.

In certain embodiments, the umbrella has: a canopy, a shaft, a runner to move up and down along the shaft to open and close the umbrella, a crank with a string attached to the runner to move the runner up and down when the crank is turned by a user, certain number of ribs to support the canopy, and certain number of stretchers. The umbrella has the same number of ribs and stretchers. Each of the stretchers has a first end and a second end. The first end of the stretcher is connected to the runner and the second end is connected to one of the ribs.

In certain embodiments, the unipath touch control circuit includes one or more application specific integrated circuits (ASIC). The unipath touch control circuit performs following operations: (a) receiving the electricity energy generated by the solar panel, (b) charging the rechargeable battery with the electrical energy using a special battery charging controller to maximize the efficiency of battery charging, (c) receiving the control signal by the user through the touch control sensors, (d) controlling the LED lights based on the current status of the LED lights and the received control signal, and (e) turning off the LED lights when the ambient light intensity reaches a pre-determined level. In certain embodiments, the LED lights include a first set of LED lights, and a second set of LED lights. The first set of LED lights is installed on the ribs of the umbrella, and the second set of LED lights is installed on a ring under the runner of the umbrella. The first touch control sensor is used to turn on or off, and to control the LED light intensity of the first set of the LED lights independently. The second touch control sensor is used to turn on or off, and to control the LED light intensity of the second set of the LED lights independently. In one embodiment, the first touch control sensor is installed on the shaft of the umbrella, and the second touch control sensor is installed on the runner of the umbrella. In certain embodiments, the touch control sensors may also include a third touch control sensor. The third control sensor is used to turn on or off, and to control the LED light intensity of the first set of LED lights and the second set of LED lights concurrently, and to switch between the first set of LED lights and the second set of LED lights. In one embodiment, the third touch control sensor is installed on the shaft of the umbrella.

In certain embodiments, the user's touch event includes one of: (a) a tap touch event, and (b) a hold touch event. The tap touch event is a touch event that a user's body part touches a touch control sensor and the user's body part is moved away immediately from the touch control sensor. The hold touch event is a touch event that the user's body part touches a touch control sensor and hold on to the touch control sensor for a certain period of time. The tap touch event is used by the user to perform one of operations of: (a) turning on the LED lights when the LED lights are off, (b) switching between the first set of LED lights and the second set of LED lights, (c) adjusting the LED light intensity of the LED lights in a discrete light intensity step, (d) turning off the LED lights when the LED lights are on, and (e) turning off the LED lights when the light intensity of the LED lights reached a predetermined level. The hold touch event is used by the user to adjust the intensity of the LED lights continuously until the intensity of the LED lights reaches a pre-determined level.

In certain embodiments, when the first set of LED lights and the second set of LED lights are off, the unipath touch control circuit performs following unipath control operations: (a) turning the first set of LED lights on, responsive to a first tap touch event on the third touch control sensor, (b) turning the second set of LED lights on and turning the first set of LED lights off, responsive to a second tap touch event on the third touch control sensor, (c) turning the first set of LED lights and the second set of LED lights on, responsive to a third tap touch event on the third touch control sensor, and (d) turning the first set of LED lights and the second set of LED lights off, responsive to a fourth tap touch event of the third touch control sensor. This control pattern may be repeated.

In certain embodiments, the solar powered LED lighting system may include a power output connector. This power output connector is positioned on the shaft of the umbrella and used to provide electricity to a separate lighting device. The separate lighting device may be a LED light strip. The LED light strip has: (a) a power connector, (b) a third set of LED lights, (c) a third set of LED light sockets, and (d) a wire. The power connector connects to the power output connector of the solar powered LED lighting system to receive electricity for the third set of LED lights. The wire connects to the third set of LED light sockets, the third set of LED lights from the power connector to provide electricity to the third set of LED lights.

In one embodiment, the solar powered LED lighting system is installed on a straight umbrella. In another embodiment, the solar powered LED lighting system is installed on an off-set umbrella.

In another aspect, the present invention relates to an umbrella. The umbrella has a shaft, a runner, a crank, a number of stretchers, and a number of ribs, a canopy and a base. In certain embodiments, the umbrella also has a rechargeable battery, a solar panel, a number of LED lights, a number of touch control sensors, and an unipath touch control circuit. The rechargeable battery may be placed in the base of the umbrella, and it is used for providing electricity to the solar powered LED lighting system. The solar panel may be placed on the top of the shaft. The solar panel receives optical energy, converts the optical energy to electrical energy, and charges the rechargeable battery with the electrical energy. The LED lights are positioned on the ribs and the runner of the umbrella for providing lighting. The touch control sensors receives user's touch event, and responsively generate control signals. The unipath touch control circuit receives the control signals from the touch control sensors, and controls the solar powered LED lighting system according to the current status of the LED lights and the received control signals.

In certain embodiments, the LED lights include a first set of LED lights, and a second set of LED lights. The first set of LED lights is installed on the ribs of the umbrella, and the second set of LED lights is installed on a ring under the runner of the umbrella. The unipath touch control circuit includes: (a) a recharging circuit, (b) a touch control integrated circuit, (c) a switching control integrated circuit, (d) a first LED driving circuit, and (e) a second LED driving circuit. The recharging circuit receives electrical energy generated by the solar panel and charges the rechargeable battery. The touch control integrated circuit senses the touch events from the touch control sensors and generates corresponding control signals. The switching control integrated circuit receives the control signals from the touch control integrated circuit, and provides a first switching control signal to control the first set of LED lights, and a second switching control signal to control the second set of LED lights. The first LED driving circuit receives the first switching control signal from the switching control integrated circuit and drives the first set of LED lights according to the received first switching control signal. The second LED driving circuit receives the second switching control signal from the switching control integrated circuit and drives the second set of LED lights according to the received second switching control signal.

In certain embodiments, the touch control integrated circuit includes: (a) a positive power source VCC, (b) a ground voltage GND, (c) an input terminal, and (d) an output terminal. The positive power source VCC of the touch control integrated circuit is connected to the positive terminal of the rechargeable battery, and the ground voltage GND of the touch control integrated circuit is connected to the ground terminal of the rechargeable battery. The input terminal is connected to a touch control circuit. The touch control circuit includes a touch control sensor, a first resistor, and a first capacitor. An output of the touch control sensor is serially connected to the input terminal through the first resistor, a first terminal of the first capacitor is connected to the input terminal and the second terminal of the first capacitor is connected to the ground. The output terminal is connected to an input terminal of the switching control integrated circuit through a second resistor to provide control signals to the switching control integrated circuit.

In certain embodiments, the switching control integrated circuit includes: (a) a positive power source VCC, (b) a ground voltage GND, (c) a control signal decoder, (d) a first switching circuit, (e) a second switching circuit, (f) a control voltage input terminal, (g) a first control voltage output terminal, and (h) a second control voltage output terminal. The positive power source VCC of the switching control integrated circuit is connected to the positive terminal of the rechargeable battery, and the ground voltage GND of the switching control integrated circuit is connected to the ground terminal of the rechargeable battery. The control signal decoder receives the control signals from the touch control integrated circuit and provides the first switching control signal and the second switching control signal. The first switching circuit receives the first switching control signal from the control signal decoder and controls the first set of LED lights. The second switching circuit receives the second switching control signal from the control signal decoder and controls the second set of LED lights. The control voltage input terminal is connected to the output terminal of the touch control integrated circuit to receive encoded control signals. The encoded control signals are decoded by the control signal decoder to form the first switching control signal and the second switching control signal. The first control voltage output terminal provides a first driving control of the first set of LED lights. The second control voltage output terminal provides a second driving control of the second set of LED lights. The first control voltage output terminal is connected to a first driving transistor through a second resistor to control the on/off and the intensity of the first set of LED lights according to the first driving control of the first set of LED lights, and the second control voltage output terminal is connected to a second driving transistor through a third resistor to control the on/off and the intensity of the second set of LED lights according to the second driving control of the first set of LED lights.

In yet another aspect, the present invention relates to a solar powered LED lighting system for an umbrella. The umbrella has a shaft, a runner, a crank, a number of stretchers, and a number of ribs, a canopy and a base. In one embodiment, the umbrella is a straight umbrella. In another embodiment, the umbrella is an off-set umbrella. The solar powered LED lighting system has (a) a rechargeable battery, (b) a solar panel, (c) one or more LED lights, (d) one or more touch control sensors, and (e) an unipath touch control circuit. The rechargeable battery is used to provide electricity to the solar powered LED lighting system. The solar panel converts optical energy to electrical energy and charges the rechargeable battery. The LED lights are installed on the umbrella to provide lighting. The touch control sensors are used to sense a user's touch event, and responsively generate a control signal. The unipath touch control circuit receives the control signals from the touch control sensors, and controls the solar powered LED lighting system according to the received control signal.

In certain embodiments, the unipath touch control circuit includes one or more application specific integrated circuits (ASIC). The unipath touch control circuit performs following operations: (a) receiving the electricity energy generated by the solar panel, (b) charging the rechargeable battery with the electrical energy using a special battery charging controller to maximize the efficiency of battery charging, (c) receiving the control signal by the user through the touch control sensors, (d) controlling the LED lights based on the current status of the LED lights and the received control signal, and (e) turning off the LED lights when the ambient light intensity reaches a pre-determined level.

In certain embodiments, the LED lights include a first set of LED lights, and a second set of LED lights. The first set of LED lights is installed on the ribs of the umbrella, and the second set of LED lights is installed on a ring under the runner of the umbrella. The touch control sensors include: (a) a first touch control, and (b) a second touch control. The first touch control sensor is used to turn on or off, and to control the LED light intensity of the first set of the LED lights independently. The second touch control sensor is used to turn on or off, and to control the LED light intensity of the second set of the LED lights independently. In one embodiment, the first touch control sensor is installed on the shaft of the umbrella, and the second touch control sensor is installed on the runner of the umbrella. In certain embodiments, the touch control sensors may also include a third touch control sensor. The third control sensor is used to turn on or off, and to control the LED light intensity of the first set of LED lights and the second set of LED lights concurrently, and to switch between the first set of LED lights and the second set of LED lights. In one embodiment, the third touch control sensor is installed on the shaft of the umbrella.

In certain embodiments, the user's touch event includes one of: (a) a tap touch event, and (b) a hold touch event. The tap touch event is a touch event that a user's body part touches a touch control sensor and the user's body part is moved away immediately from the touch control sensor. The hold touch event is a touch event that the user's body part touches a touch control sensor and hold on to the touch control sensor for a certain period of time. The tap touch event is used by the user to perform one of operations of: (a) turning on the LED lights when the LED lights are off, (b) switching between the first set of LED lights and the second set of LED lights, (c) adjusting the LED light intensity of the LED lights in a discrete light intensity step, (d) turning off the LED lights when the LED lights are on, and (e) turning off the LED lights when the light intensity of the LED lights reached a predetermined level. The hold touch event is used by the user to adjust the intensity of the LED lights continuously until the intensity of the LED lights reaches a pre-determined level.

In certain embodiments, when the first set of LED lights and the second set of LED lights are off, the unipath touch control circuit performs following unipath control operations: (a) turning the first set of LED lights on, responsive to a first tap touch event on the third touch control sensor, (b) turning the second set of LED lights on and turning the first set of LED lights off, responsive to a second tap touch event on the third touch control sensor, (c) turning the first set of LED lights and the second set of LED lights on, responsive to a third tap touch event on the third touch control sensor, and (d) turning the first set of LED lights and the second set of LED lights off, responsive to a fourth tap touch event of the third touch control sensor. This control pattern may be repeated.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
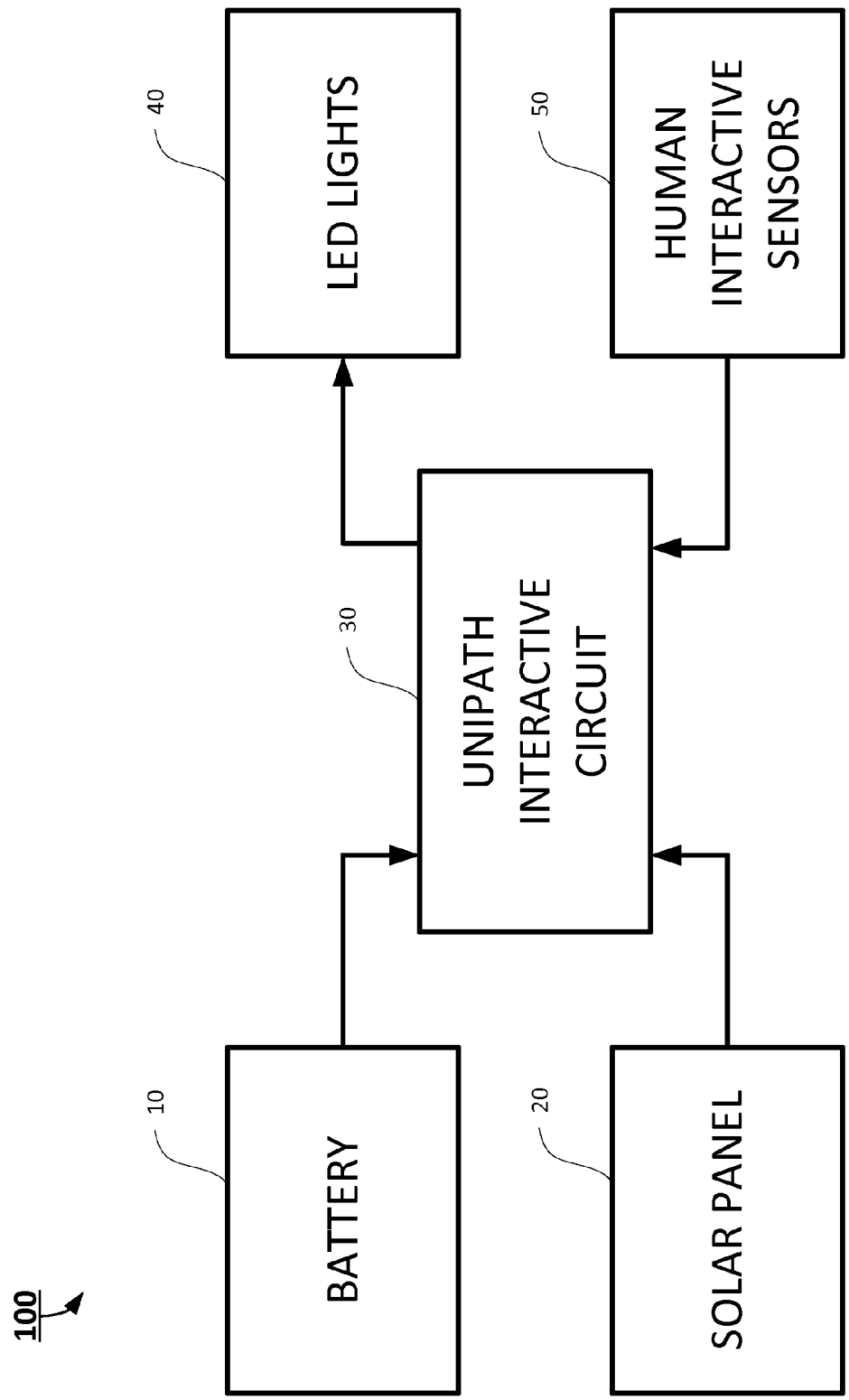
FIG. 1 shows a block diagram of a solar powered LED lighting system installed on a large umbrella according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate; meaning that the term "around", "about", "substantially" or "approximately" can be inferred if not expressly stated.

The description will be made as to the embodiments of the present invention in conjunction with the accompanying drawings in FIGS. 1-5. In accordance with the purposes of this invention, as embodied and broadly described herein, this invention, in one aspect, relates to a large umbrella with a solar powered LED lighting system.

A large umbrella usually has a shaft to hold the umbrella, and the shaft is placed on a base such that the umbrella can stand without any user's help. The large umbrella also includes a runner to move up and down the shaft to open and close the umbrella. The umbrella also has a number of stretchers installed on the runner and connected to the same number of ribs to support a canopy over the umbrella. In order to facilitate easy opening and closing the large umbrella, a crank may be added to the umbrella. The crank is connected to the runner through a string or a cord to move the runner up and down. When the runner is moved up, the umbrella is opened. When the runner is moved down, the umbrella is closed. The umbrella can be (a) a straight umbrella where the canopy of the umbrella is centered around the shaft, (b) a tilted umbrella where the canopy of the umbrella can be tilted to form an obtuse angle between the shaft and the axis of the umbrella, and (c) an off-set umbrella where the axis of the umbrella are parallel to the shaft.

Referring now to FIG. 1, a solar powered LED lighting system 100 is shown according to one embodiment of the present invention. The solar powered LED lighting system 100 includes: (a) a battery 10, (b) a solar panel 20, (c) a unipath interactive circuit 30, (d) one or more LED lights 40, and (e) one or more touch control sensors 50.

In certain embodiments, the battery 10 is used to power the unipath interactive circuit 30, and all the LED lights 40 of the solar powered LED lighting system 100. In one embodiment, the battery 10 is a rechargeable battery. In one embodiment, the rechargeable battery 10 is a multiple battery pack. In one embodiment, the rechargeable battery 10 is installed in a base of a large umbrella.

In certain embodiments, the LED lights include a first set of LED lights 40, and a second set of LED lights 42. The first set of LED lights 40 is installed on the ribs of the umbrella, and the second set of LED lights 42 is installed on a ring under the runner of the umbrella.

In certain embodiments, the solar panel 20 is used to receive optical energy and convert the received optical energy into electrical energy to charge the rechargeable battery 10 and to store the electrical energy generated by the solar panel 20 during the day. In the evening when illumination of the area under the umbrella is needed, the electrical energy stored in the rechargeable battery 10 is used to power the solar powered LED lighting system 100. In certain embodiments, the unipath interactive circuit 30 includes a special battery charging controller to maximize the efficiency of the battery charging.

In certain embodiments, the unipath interactive circuit 30 is used to control the solar powered LED lighting system 100. The unipath interactive circuit 30 is configured to perform one or more of following operations: (a) receiving the electrical energy generated from the solar panel 20, (b) charging the rechargeable battery 10 and storing electrical energy in the rechargeable battery 10 during the day, (c) controlling the LED light intensity by using the touch control sensors 50, and (d) turning on or off the LED lights 40 using the touch control sensors 50. In one embodiment, the unipath interactive circuit 30 is installed near the rechargeable battery 10. In another embodiment, the unipath interactive circuit 30 is installed near the solar panel 20.

Figure 3A:
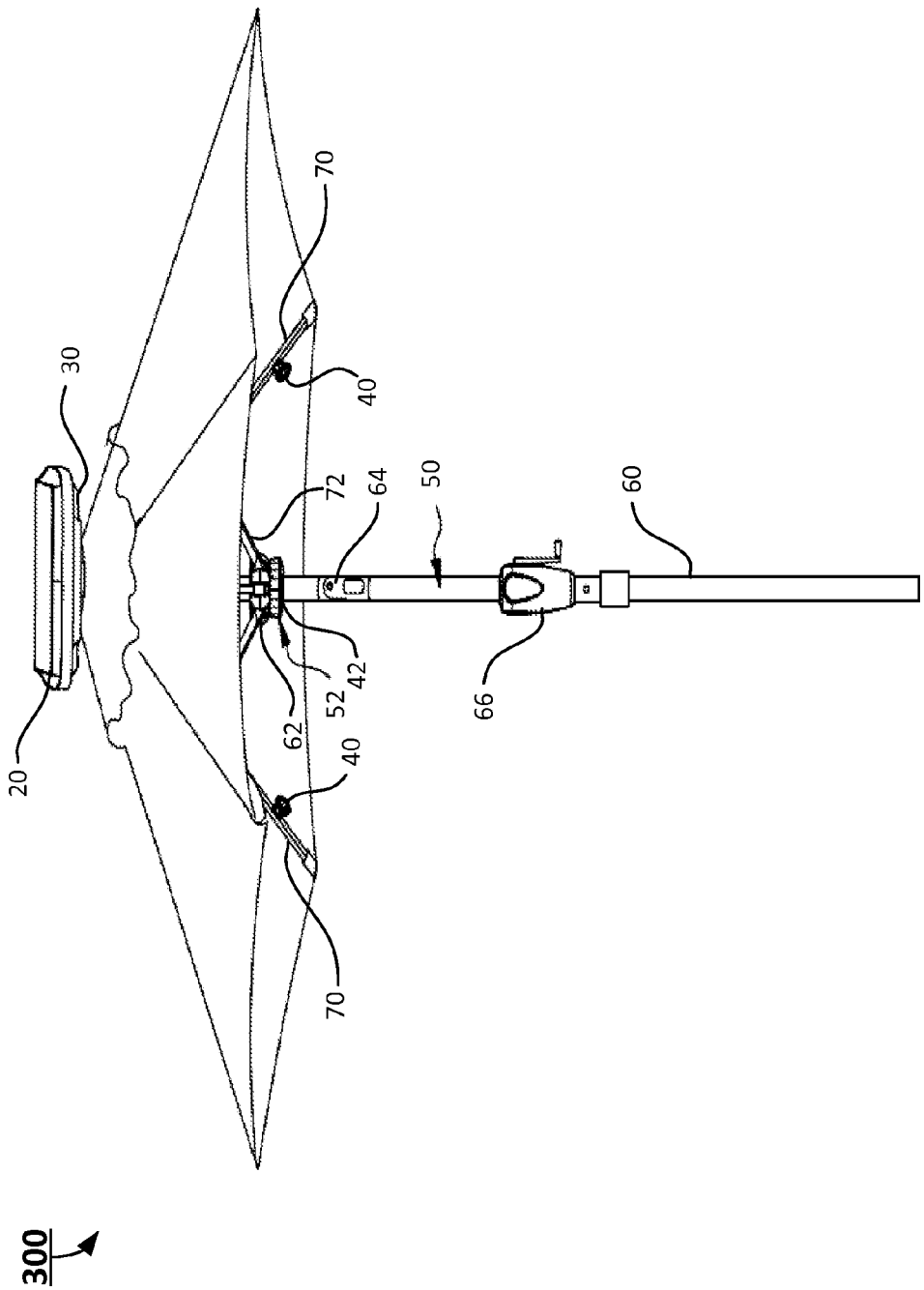
FIG. 3A is a perspective view of a large umbrella having the solar powered LED lighting system.
Figure 3B:
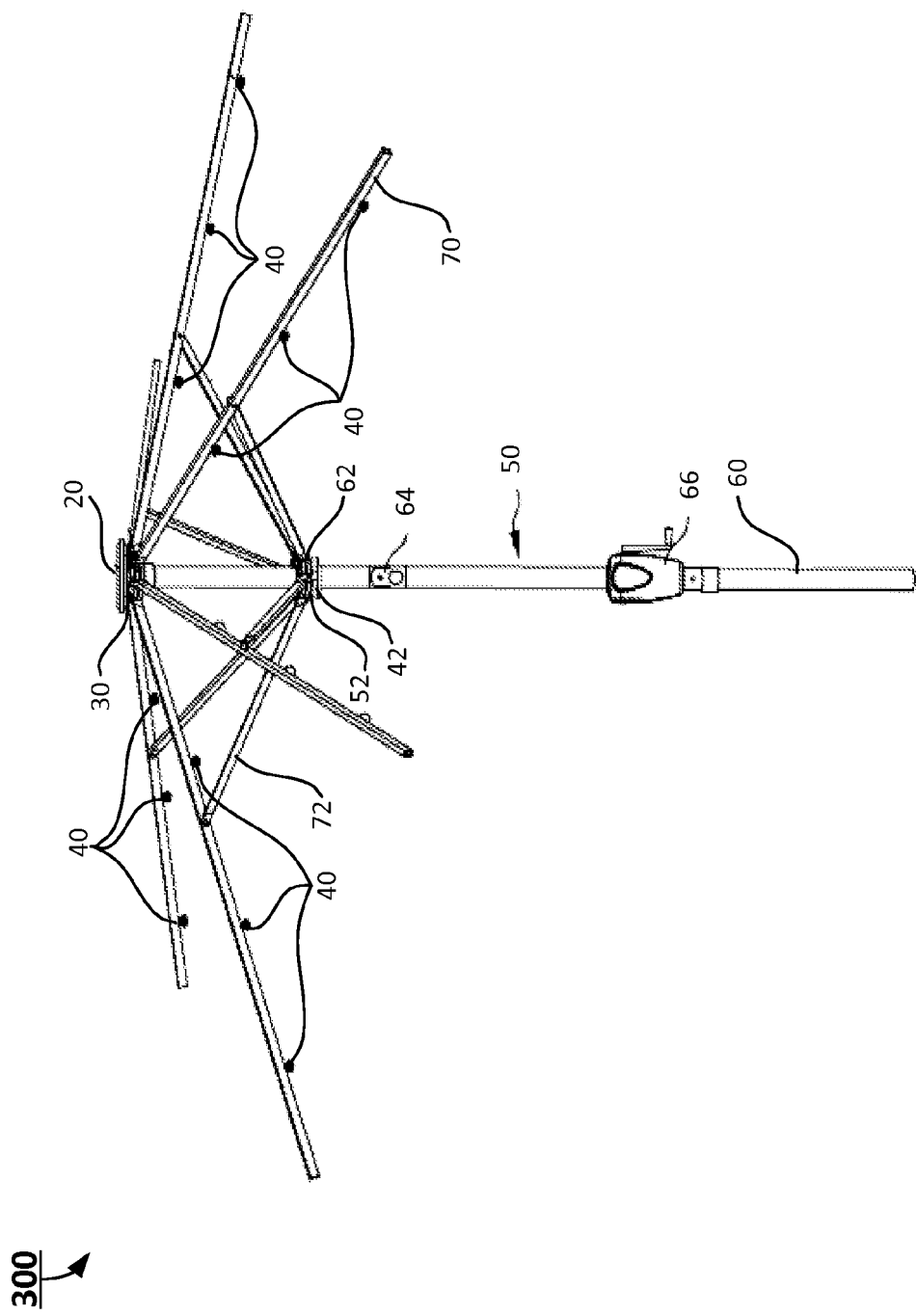
FIG. 3B is a perspective view of a large umbrella having the solar powered LED lighting system with its canopy removed according to certain embodiments of the present invention.

In certain embodiments, the first set of LED lights 40 is used to illuminate the area under the canopy of the umbrella, and to decorate the umbrella. In one embodiment, the first set of LED lights 40 includes white LED lights for illumination. In another embodiment, the first set of LED lights 40 includes multiple color LED lights for decoration. In one embodiment, the first set of LED lights 40 is installed under the canopy on the lower side of the ribs of the umbrella to provide general illumination under the umbrella, as shown in FIGS. 3A and 3B. In one embodiment, the second set of LED lights 42 is installed in the lower side of the runner to provide a focused lighting at the center of the umbrella, as shown in FIGS. 3A and 3B. In other embodiments, the first set of LED lights 40 in multiple colors can be installed over the upside of the canopy for decoration.

In certain embodiments, the LED lights 40 can also be installed on an LED light strip where one or more LED lights 40 are installed to provide general lighting where the lighting is needed. The shaft of the umbrella may provide a connector to be used by the LED light strip.

In certain embodiments, the touch control sensors 50 are configured to receive users' control event from a touch control integrated circuit on the unipath interactive circuit 30. In one embodiment, a touch control sensor 50 is installed on the certain portion of the shaft and is configured to control the first set of LED lights 40 installed on the ribs of the umbrella. In another embodiment, a touch control sensor 52 is installed on the lower portion of the runner and is configured to control the second set of LED lights 42 installed on the lower side of the runner of the umbrella.

In certain embodiments. The user's touch event includes one of: (a) a tap touch event, and (b) a hold touch event. The tap touch event is a touch event that a user's body part touches a touch control sensor and the user's body part is moved away immediately from the touch control sensor. The hold touch event is a touch event that the user's body part touches a touch control sensor and hold on to the touch control sensor for a certain period of time. In one embodiment, the certain period of time of the hold touch event is at least 0.25 second or longer. In another embodiment, the certain period of time of the hold touch event is more than 0.5 second. The tap touch event is used by the user to perform the operations of: (a) turning on the LED lights when the LED lights are off, (b) switching between the first set of LED lights 40 and the second set of LED lights 42, (c) adjusting the LED light intensity of the LED lights in a discrete light intensity step, (d) turning off the LED lights when the LED lights are on, and (e) turning off the LED lights when the light intensity of the LED lights reached a predetermined level. The hold touch event is used by the user to adjust the intensity of the LED lights continuously until the intensity of the LED lights reaches a pre-determined level.

In certain embodiments, the touch control integrated circuit receives user's touch event, and follows certain patterns to control the on/off and the intensity of the first set of LED lights 40, and the second set of LED lights 42. In one embodiment, if the first set of LED lights 40 and the second set of LED lights 42 are off, and the touch control sensors 50 senses a series of tap touch events at night, the first set of LED lights 40 and the second set of LED lights 42 are controlled in following manner: (a) turning the first set of LED lights on, responsive to a first tap touch event on the third touch control sensor, (b) turning the second set of LED lights on and turning the first set of LED lights off, responsive to a second tap touch event on the third touch control sensor, (c) turning the first set of LED lights and the second set of LED lights on, responsive to a third tap touch event on the third touch control sensor, and (d) turning the first set of LED lights and the second set of LED lights off, responsive to a fourth tap touch event of the third touch control sensor.

Depending on the configuration of the unipath interactive circuit 30, other control methods of the first set of LED lights 40 and the second set of LED lights 42 are also available. For example, the first set of LED lights 40 and the second set of LED lights 42 can be controlled by separate touch control sensors 50, and 52 independently. In one embodiment, if the first set of LED lights 40 is off, and when the touch control sensor 50 senses a tap touch event at night, the first set of LED lights 40 will be turned on to provide lighting. Once the first set of LED lights 40 is on, and when the touch control sensor 50 senses a second tap touch event at at night, the light intensity of the first set of LED lights 40 may be changed. In one embodiment, if the second set of LED lights 42 is off, and when the touch control sensors 52 senses a tap touch event at night at night, the second set of LED lights 42 will be turned on to provide a focused lighting in the center of the umbrella. Once the second set of LED lights 42 is on, and when the touch control sensor 52 senses a tap touch event at night, the light intensity of the second set of LED lights 42 may be changed. When the user executes a hold touch event on the touch control sensors 50 and 52, the intensity of the first set of LED lights 40 and the second set of LED lights 42 can be changed continuously until the intensity of the LED lights reaches the maximum level or minimum level. When the intensity of the LED lights reaches the minimum level, the first set of LED lights 40 and the second set of LED lights 42 are turned off.

Figure 2:
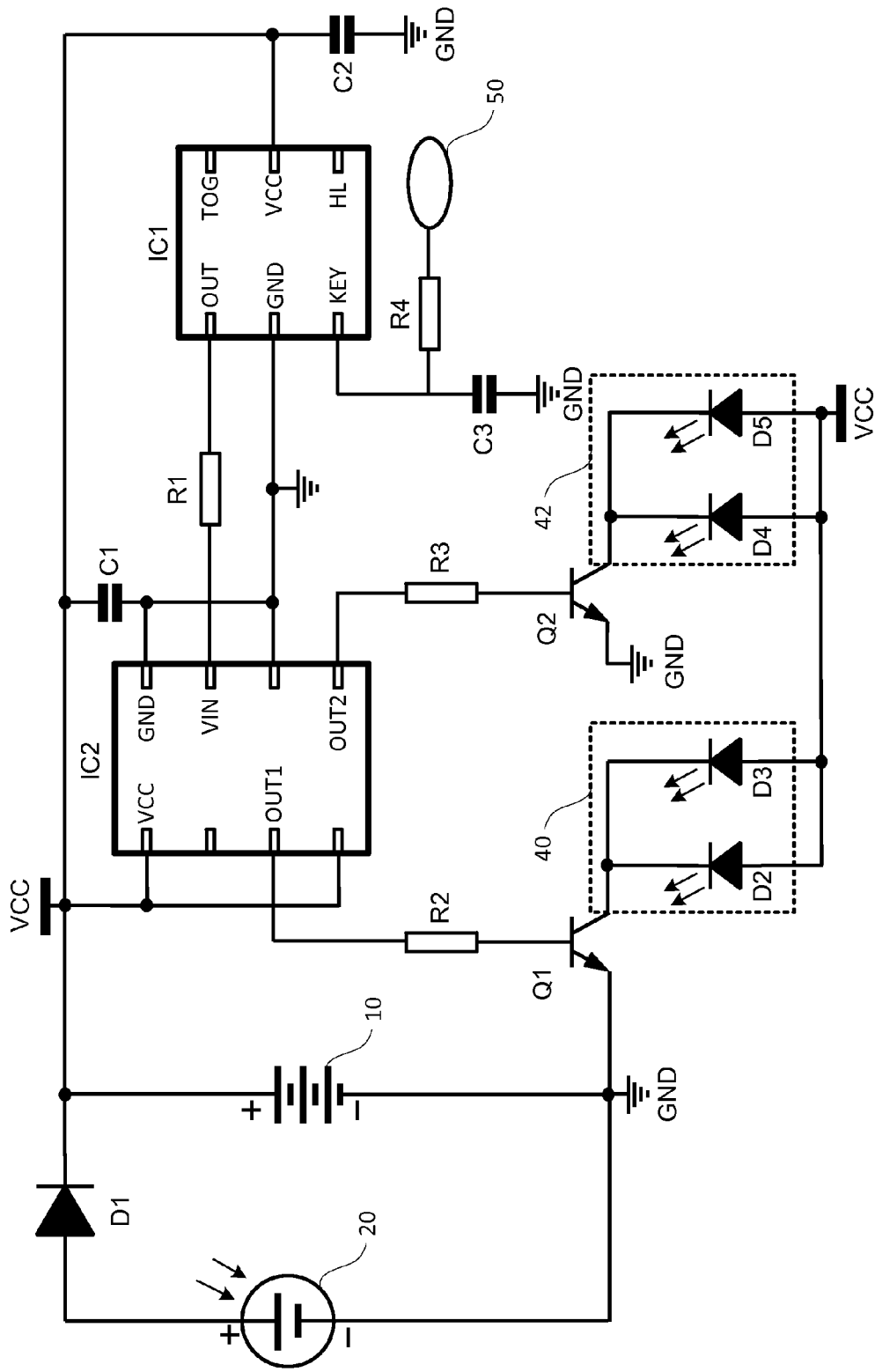
FIG. 2 shows an exemplary circuit diagram of the solar powered LED lighting system installed on a large umbrella according to one embodiment of the present invention.

Referring to FIG. 2, an exemplary circuit diagram of the solar powered LED lighting system is shown according to one embodiment of the present invention. In certain embodiments, the solar powered LED lighting system has a rechargeable battery 10, a solar panel 20, a first set of LED lights 40, a second set of LED lights 42, a touch control sensor 50, and an unipath interactive circuit. The solar panel 20 generates electrical energy and charges the rechargeable battery 10 when the sunlight is available. The solar panel 20 has a positive output terminal and a negative output terminal. The rechargeable battery 10 also has a positive terminal and a negative terminal. The positive output terminal of the solar panel 20 is connected to the positive terminal of the rechargeable battery 10, and the negative output terminal of the solar panel 20 is connected to the negative terminal of the rechargeable battery 10. A special battery charging controller is adapted to maximize the efficiency of battery charging. The special battery charging controller includes a diode D1 connecting the positive output terminal of the solar panel 20 to the positive terminal of the rechargeable battery 10 to control the direction of electricity generated. The diode D1 only allows the current to flow from the solar panel 20 to the rechargeable battery 10, not the other way around. The positive terminal of the rechargeable battery 10 provides a VCC voltage to the solar powered LED lighting system, and the negative terminal of the rechargeable battery 10 provides a ground to the solar powered LED lighting system. Between the positive terminal (VCC) and the negative terminal (GND) of the rechargeable battery 10, two capacitors C1, and C2 are installed to stabilize the VCC voltage.

In certain embodiments, the unipath interactive circuit includes a touch control integrated circuit IC1 and a switching control integrated circuit IC2. The IC1 and IC2 are two application specific integrated circuits (ASIC). In certain embodiments, the touch control integrated circuit IC1 has: (a) a first input terminal KEY, (b) a second input terminal HL, (c) a third input terminal TOG, (d) an output terminal OUT, (e) a positive power source VCC, and (f) a ground voltage GND. The power supply to the touch control integrated circuit IC1 is provided by the positive power source VCC and the ground voltage GND. The first input terminal KEY is connected to a touch control sensor 50 through a current limiting resistor R4, and a capacitor C3. When a user touches the touch control sensor 50, it generates a voltage potential across the C3 and applies to the first input terminal KEY. The voltage potential is used to control the touch control integrated circuit IC1. When the second input terminal HL is connected to a voltage, the high input voltage will cause the touch control integrated circuit IC1 to turn on at the output terminal OUT, and a low input voltage will cause the touch control integrated circuit IC1 to turn off at the output terminal OUT. When the third input terminal TOG is connected to a touch control sensor 50 through a current limiting resistor R4, and a capacitor C3 as shown in the FIG. 2, one user touch of the touch control sensor 50 causes the touch control integrated circuit IC1 to turn on at the output terminal OUT, and another user touch of the touch control sensor 50 causes the touch control integrated circuit IC1 to turn off at the output terminal OUT.

In one embodiment, the output voltage of the output terminal OUT may be in binary high and binary low voltages. In another embodiment, the output voltage of the output terminal OUT may be encoded to provide multiple switching states instead of only binary high and binary low voltages. For example, in one embodiment, a user uses unipath control to control the solar powered LED lighting system: (a) turning on the second set of LED lights 42 at the user's first touch, (b) turning on the first set of LED lights 40, and turning off the second set of LED lights 42 at the user's second touch, (c) turning on both the first set of LED lights 40 and the second set of LED lights 42 simultaneously at the user's third touch, and (d) turning off both the first set of LED lights 40 and the second set of LED lights 42. According to this method, the output terminal OUT may include four different control states: (a) both the first set of LED lights 40 and the second set of LED lights 42 are off, (b) the first set of LED lights 40 is on and the second set of LED lights 42 is off, (c) the first set of LED lights 40 is off and the second set of LED lights 42 is on, and (d) both the first set of LED lights 40 and the second set of LED lights 42 are on. These control states can be encoded as 2 digits binary codes such as 00, 01, 10, and 11 to represent four different control states respectively.

In certain embodiments, the switching control integrated circuit IC2 has: (a) a control voltage input terminal VIN, (b) a first control voltage output terminal OUT1, (c) a second control voltage output terminal OUT2, (d) a positive power source VCC and (e) a ground voltage GND. The power supply to the switching control integrated circuit IC2 is provided by the positive power source VCC and the ground voltage GND.

The control voltage input terminal VIN is connected to the output terminal OUT of the touch control integrated circuit IC1 to receive touch control output. In one embodiment, the switching control integrated circuit IC2 is configured to receive binary high and binary low voltage. In another embodiment, the switching control integrated circuit IC2 is configured to receive multiple digits binary high and binary low voltages. The switching control integrated circuit IC2 is capable of decoding such multiple digits binary high and binary low voltages. In certain embodiments, the first control voltage output terminal OUT1 is configured to control the first set of LED lights 40, and the second control voltage output terminal OUT2 is configured to control the second set of LED lights 42. The first control voltage output terminal OUT1 is connected to base terminal of a first switching transistor Q1 through a first current limiting resistor R2, and the second control voltage output terminal OUT2 is connected to the base terminal of a switching transistor Q2 through a second current limiting resistor R3. When the output voltage of the first control voltage output terminal OUT1 is in binary high voltage, the first current limiting resistor R2 causes the voltage of the collector of the first switching transistor Q1 to become low voltage and therefore to turn on the first set of LED lights 40. When the output voltage of the first control voltage output terminal OUT1 is in binary low voltage, the first current limiting resistor R2 causes the voltage of the collector of the first switching transistor Q1 to become high voltage and therefore to turn off the first set of LED lights 40. When the output voltage of the second control voltage output terminal OUT2 is in binary high voltage, the second current limiting resistor R3 causes the voltage of the collector of the second switching transistor Q2 to become low voltage and therefore to turn on the second set of LED lights 42. When the output voltage of the second control voltage output terminal OUT2 is in binary low voltage, the second current limiting resistor R3 causes the voltage of the collector of the second switching transistor Q2 to become high voltage and therefore to turn off the second set of LED lights 42.

Figure 4:
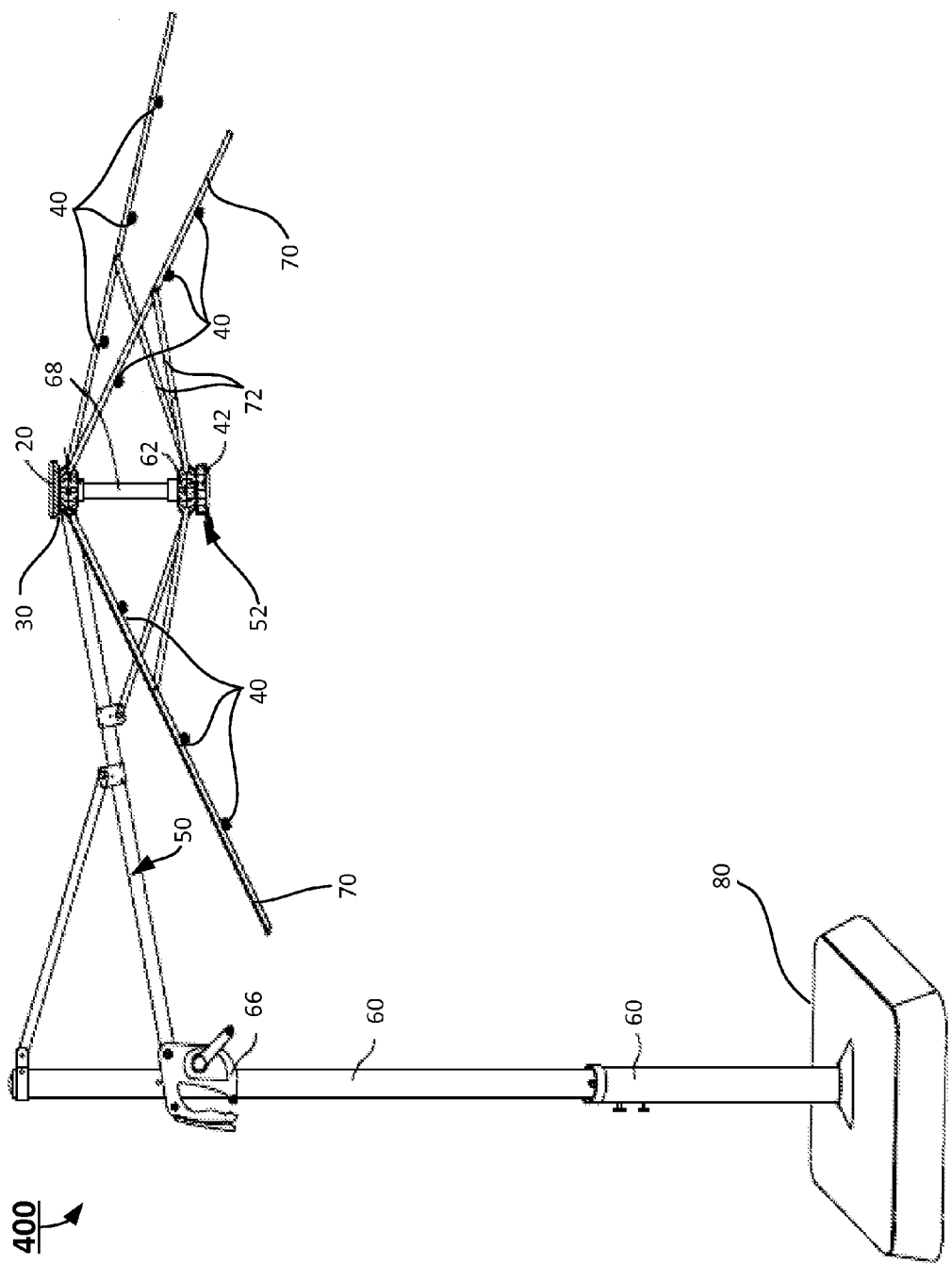
FIG. 4 is a perspective view of a large off-set umbrella having a solar powered LED lighting system with its canopy removed according to one embodiment of the present invention.

Referring to FIGS. 3-4, a few embodiments of such large umbrellas having the solar powered LED lighting system 100 are shown according to certain embodiments of the present invention.

In one embodiment, an upper portion of a large umbrella 300 having the solar powered LED lighting system is shown in FIG. 3A. Another upper portion of a large umbrella 300 having the solar powered LED lighting system is shown in FIG. 3B. In this drawing, the canopy of the large umbrella 300 is removed for clarity. The large umbrella 300 includes a base (not shown in FIG. 3A or FIG. 3B), a center shaft 60, a runner 62 to move up and down the shaft to open and close the umbrella 300. The umbrella also has a number of stretchers 72 installed on the runner 62 and connected to the same number of ribs 70 to support a canopy over the umbrella 300. The umbrella 300 also has a crank 66 connected to the runner 62 through a string or a cord to move the runner 62 up and down. When the runner 62 is moved up, the umbrella 300 is opened. When the runner 62 is moved down, the umbrella 300 is closed.

The rechargeable battery 10 is placed in the base (not shown in FIGS. 3A and 3B) of the umbrella 300, and electric wires are placed in the middle of the shaft 60 to connect to the other parts of the solar powered LED lighting system. The solar panel 20 is placed on the top of the center shaft 60 to receive sunlight and generate electricity. In one embodiment, the unipath interactive circuit 30 is installed in the lower portion of the solar panel 20, and integrated with the solar panel 20. The first set of LED lights 40 is evenly distributed on the ribs 70 to form an array of LED lights to illuminate the area under the umbrella 300. The second set of LED lights 42 is distributed on a ring just under the runner 62 to form a center of LED light to illuminate a focused area under the umbrella 300. A first touch control sensor 50 is installed on the crank 66 to control the first set of LED lights 40. A second touch control sensor 52 is installed on top of the second set of LED lights 42 to control the LED lights 42.

In one embodiment, a perspective view of a large off-set umbrella 400 having the solar powered LED lighting system is shown in FIG. 4 according to certain embodiments of the present invention. In this drawing, the canopy of the large umbrella 400 is removed for clarity. The large umbrella 400 includes a base 80, a shaft 60, and a center shaft 68, a runner 62 to move up and down the center shaft 68 to open and close the umbrella 400. The umbrella also has a number of stretchers 72 installed on the runner 62 and connected to the same number of ribs 70 to support a canopy over the umbrella 400. The umbrella 400 also has a crank 66 connected to the runner 62 through a string or a cord to move the runner 62 up and down along the center shaft 68. When the runner 62 is moved up, the umbrella 400 is opened. When the runner 62 is moved down, the umbrella 400 is closed.

The rechargeable battery 10 is placed in the base 80 of the umbrella 400, and electric wires are placed in the middle of the shaft 60 to connect to the other parts of the solar powered LED lighting system. The solar panel 20 is placed on the top of the center shaft 60 to receive sunlight and generate electricity. In one embodiment, the unipath interactive circuit 30 is installed in the lower portion of the solar panel 20, and integrated with the solar panel 20. The first set of LED lights 40 is evenly distributed on the ribs 70 to form an array of LED lights to illuminate the area under the umbrella 400. The second set of LED lights 42 is distributed on a ring just under the runner 62 to form a center LED light to illuminate a focused area under the umbrella 400. A first touch control sensor 50 is installed on the extended arm of the umbrella 400 to control the first set of LED lights 40. A second touch control sensor 52 is installed on top of the second set of LED lights 42 to control the second set of LED lights 42.

Figure 5:
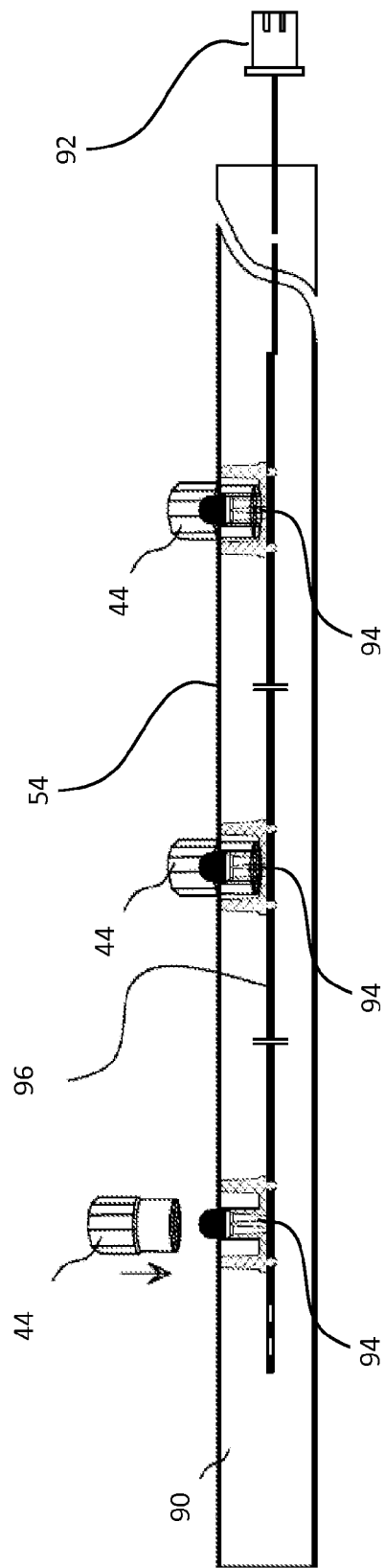
FIG. 5 is an illustration of an LED light strip that can be installed in addition to the solar powered LED lighting system to provide additional lighting according to one embodiment of the present invention.

Optionally, a power output connector 64 shown in FIGS. 3A and 3B, is installed on the umbrellas 300 to provide electrical power to an LED light strip 90 as shown in FIG. 5 according to certain embodiments of the present invention. The LED light strip 90 include (a) a power connector 92 to be connected to the optional power output connector 64, (b) a third set of LED lights 44, (c) a third set of LED light sockets 94, and (d) a wire 96 to connect the electrical power from the power connector 92 to the LED light sockets 94 and the LED lights 44. In one embodiment, the on/off and the intensity of the LED light strip 90 can be controlled through the touch control sensor 50, or 52. In another embodiment, a separate touch control sensor 54 can be installed on the body of the LED light strip 90 to control the on/off and intensity of the LED lights 44 of the LED light strip 90.

The solar powered LED lighting system is controlled by user's touches over touch control sensors installed on the LED lighting system. In one embodiment, the first set of LED lights 40, the second set of LED lights 42, and the LED light strip 90 are controlled by a single unipath interactive circuit 30. In another embodiment, the first set of LED lights 40, the second set of LED lights 42, and the LED light strip 90 are controlled by separate unipath interactive circuit 30 independently. The unipath interactive circuit 30 includes one or more application specific integrated circuits (ASIC) specially designed to perform the solar power management, and to control the LED lights. In the following example, the first set of LED lights 40 is controlled by the touch control sensors 50. A touch control sensor 50 is used by a user to control the first set of LED lights 40. The unipath interactive circuit 30 is configured to perform one or more of following operations:

receiving electrical power generated by the solar panel 20;
charging the rechargeable battery 10 using a special battery charging controller to maximize the efficiency of the battery charging;
sensing user's touch event through one or more touch control sensors 50; and
controlling the on/off and intensity of the first set of LED lights 40, based on the current status of the first set of LED lights 40; and
turning off the first set of LED lights 40 when the ambient light intensity reaches a pre-determined level.

In one embodiment, the on/off and the intensity of the first set of LED lights 40 is controlled in following manner:
turning the first set of LED lights on, responsive to a first tap touch event on the third touch control sensor,
turning the second set of LED lights on and turning the first set of LED lights off, responsive to a second tap touch event on the third touch control sensor,
turning the first set of LED lights and the second set of LED lights on, responsive to a third tap touch event on the third touch control sensor, and
turning the first set of LED lights and the second set of LED lights off, responsive to a fourth tap touch event of the third touch control sensor.

In another embodiment, the on/off and the intensity of the first set of LED lights 40 is controlled in following manner:
If the first set of LED lights 40 is off, the first set of LED lights 40 is turned on to their maximum intensity level when the touch control sensor 50 senses a tap touch event;
Another tap touch event or a hold touch event causes the first set of LED lights 40 to decrease the intensity of the first set of LED lights 40;
If the user touches and holds (hold touch event) on the touch control sensor 50, the intensity of the first set of LED lights 40 continues to decrease until the first set of LED lights 40 reach their minimum level. In this case, the first set of LED lights 40 is turned off.

In yet another embodiment, the on/off and the intensity of the second set of LED lights 42 is controlled in following manner:
If the second set of LED lights 42 is off, the second set of LED lights 42 is turned on to their minimum intensity level when the touch control sensor 52 senses a tap touch event;
Another tap touch event or a hold touch event on the touch control sensor 52 causes the second set of LED lights 42 to increase the intensity of the second set of LED lights 42;
If the user touches and holds (hold touch event) on the touch control sensor 52, the intensity of the second set of LED lights 42 continues to increase until the second set of LED lights 42 reach its maximum level; and
Another tap touch event on the touch control sensor 52 turns off the second set of LED lights 42.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. An umbrella, comprising:
a shaft, a runner, a crank, a plurality of stretchers, a plurality of ribs, a canopy and a base;
a rechargeable battery positioned in the base, and configured to provide electricity to the solar powered LED lighting system;
a solar panel positioned on the top of the shaft, and configured to receive optical energy, to convert the optical energy to electrical energy, and to charge the rechargeable battery with the electrical energy;

a plurality of LED lights, comprising a first set of LED lights installed on the plurality of ribs of the umbrella and configured to provide lighting, and a second set of LED lights installed on a ring under the runner of the umbrella and configured to provide lighting;

a plurality of touch control sensors configured to receive user's touch event, and responsively generate control signals; and a touch control circuit configured to receive the control signals from the plurality of touch control sensors, and control the solar powered LED lighting system according to the current status of the plurality of LED lights and the received control signals, wherein the touch control circuit comprises:
  a recharging circuit configured to receive electrical energy generated by the solar panel and charge the rechargeable battery;
  a touch control integrated circuit configured to sense the touch events from the plurality of touch control sensors and generate corresponding control signals;
  a switching control integrated circuit configured to receive the control signals from the touch control integrated circuit, and provide a first switching control signal to control the first set of LED lights, and a second switching control signal to control the second set of LED lights;
  a first LED driving circuit configured to drive the first set of LED lights according to the first switching control signal; and
  a second LED driving circuit configured to drive the second set of LED lights according to the second switching control signal; and wherein the touch control integrated circuit includes:
  a positive power source VCC connected to the positive terminal of the rechargeable battery;
  a ground voltage GND connected to the ground terminal of the rechargeable battery;
  an input terminal connected to a touch control circuit, wherein the touch control circuit comprises a touch control sensor, a first resistor, and a first capacitor, and an output of the touch control sensor is serially connected to the input terminal through the first resistor, a first terminal of the first capacitor is connected to the input terminal and the second terminal of the first capacitor is connected to the ground; and
  an output terminal connected to an input terminal of the switching control integrated circuit through a second resistor to provide control signals to the switching control integrated circuit.

2. The umbrella of claim 1, further comprising a power output connector positioned on the shaft of the umbrella and configured to provide electricity to a separate lighting device.

3. The umbrella of claim 2, wherein the separate lighting device comprises a LED light strip, wherein the LED light strip comprises:
  a power connector to connect to the power output connector of the solar powered LED lighting system;
  a third set of LED lights;
  a plurality of LED light sockets configured to install the third set of LED lights; and
  a wire to connect the electricity from the power connector to the LED light sockets and the LED lights.

4. The umbrella of claim 1, wherein the switching control integrated circuit includes:
  a positive power source VCC connected to the positive terminal of the rechargeable battery;
  a ground voltage GND connected to the ground terminal of the rechargeable battery;
  a control signal decoder configured to receive the control signals from the touch control integrated circuit and provide the first switching control signal and the second switching control signal;
  a first switching circuit configured to receive the first switching control signal from the control signal decoder and control the first set of LED lights;
  a second switching circuit configured to receive the second switching control signal from the control signal decoder and control the second set of LED lights;
  a control voltage input terminal connected to the output terminal of the touch control integrated circuit to receive encoded control signals, wherein the encoded control signals are decoded by the control signal decoder to form the first switching control signal and the second switching control signal;
  a first control voltage output terminal configured to provide a first driving control of the first set of LED lights; and
  a second control voltage output terminal configured to provide a second driving control of the second set of LED lights.

5. The umbrella of claim 4, wherein the first control voltage output terminal is connected to a first driving transistor through a second resistor to control the on/off and the intensity of the first set of LED lights according to the first driving control of the first set of LED lights, and the second control voltage output terminal is connected to a second driving transistor through a third resistor to control the on/off and the intensity of the second set of LED lights according to the second driving control of the first set of LED lights.

6. The umbrella of claim 1, wherein the touch control circuit comprises one or more application specific integrated circuits (ASIC) configured to perform one or more of following operations:
  receiving the electricity energy generated by the solar panel;
  charging the rechargeable battery with the received electrical energy, wherein a battery charging controller is adapted to maximize the efficiency of battery charging;
  receiving the control signal by the user through the plurality of touch control sensors;
  controlling the plurality of LED lights, based on the current status of the plurality of LED lights and the received control signal; and
  turning off the plurality of LED lights when the ambient light intensity reaches a pre-determined level.

7. The umbrella of claim 6, wherein the plurality of touch control sensors comprises:
  a first touch control sensor used to turn on or off, and to control the LED light intensity of the first set of the LED lights independently; and
  a second touch control sensor used to turn on or off, and to control the LED light intensity of the second set of the LED lights independently.

8. The umbrella of claim 7, wherein the plurality of touch control sensors comprises a third touch control sensor positioned on the shaft of the umbrella and configured to turn on or off, and to selectively control the LED light intensity of the first set of LED lights and the second set of LED lights concurrently, and to switch between the first set of LED lights and the second set of LED lights.

9. The umbrella of claim 8, wherein the user's touch event comprises:
a tap touch event, wherein the tap touch event is a touch event that a user's body part touches a touch control sensor and the user's body part is moved away immediately from the touch control sensor; and
a hold touch event, wherein the hold touch event is a touch event that the user's body part touches a touch control sensor and hold on to the touch control sensor for a certain period of time.

10. The umbrella of claim 9, wherein the tap touch event is used by the user to perform one of the operations of:
turning on the plurality of LED lights when the plurality of LED lights is off;
switching between the first set of LED lights and the second set of LED lights;
adjusting the LED light intensity of the plurality of LED lights in a discrete light intensity step;
turning off the plurality of LED lights when the plurality of LED lights is on; and
turning off the plurality of LED lights when the light intensity of the plurality of LED lights reached a predetermined level.

11. The umbrella of claim 10, wherein the hold touch event is used by the user to adjust the intensity of the plurality of LED lights continuously until the intensity of the plurality of LED lights reaches a pre-determined level.

12. The umbrella of claim 9, wherein the touch control circuit is configured to perform following control operations, when the first set of LED lights and the second set of LED lights are off:
turning the first set of LED lights on, responsive to a first tap touch event on the third touch control sensor;
turning the second set of LED lights on and turning the first set of LED lights off, responsive to a second tap touch event on the third touch control sensor;
turning the first set of LED lights and the second set of LED lights on, responsive to a third tap touch event on the third touch control sensor; and
turning the first set of LED lights and the second set of LED lights off, responsive to a fourth tap touch event on the third touch control sensor.

* * * * *